United States Patent [19]

Shustack

[11] Patent Number: 5,527,835
[45] Date of Patent: Jun. 18, 1996

[54] ORGANIC SOLVENT AND WATER RESISTANT HYDROLYTICALLY STABLE ULTRAVIOLET RADIATION CURABLE COATINGS FOR OPTICAL FIBERS

[75] Inventor: Paul J. Shustack, West Chester, Ohio

[73] Assignee: Borden, Inc., Columbus, Ohio

[21] Appl. No.: 341,172

[22] Filed: Nov. 16, 1994

Related U.S. Application Data

[63] Continuation of Ser. No. 169,544, Dec. 20, 1993, abandoned, which is a continuation of Ser. No. 873,105, Apr. 24, 1992, abandoned.

[51] Int. Cl.$^6$ ............... C08F 2/50; G02B 6/00; D02G 3/00; C08G 71/04
[52] U.S. Cl. ............... 522/42; 522/44; 522/79; 522/90; 522/96; 385/145; 385/123; 428/378
[58] Field of Search .................. 522/42, 96, 97, 522/79, 44, 90

[56] References Cited

U.S. PATENT DOCUMENTS

| | | | |
|---|---|---|---|
| 4,088,498 | 5/1978 | Faust | 96/115 P |
| 4,120,721 | 10/1978 | Ketley et al. | 96/363 |
| 4,125,644 | 11/1978 | Ketley et al. | 427/36 |
| 4,131,602 | 12/1978 | Hodakowski et al. | 528/49 |
| 4,133,723 | 1/1979 | Howard | 204/15 |
| 4,151,055 | 4/1979 | Stueben et al. | 204/159.15 |
| 4,188,455 | 2/1980 | Howard | 428/423.1 |
| 4,192,762 | 3/1980 | Osborn | 252/182 |
| 4,210,713 | 7/1980 | Sumiyoshi et al. | 430/284 |
| 4,255,243 | 3/1981 | Couqueugniot et al. | 204/159.15 |
| 4,264,752 | 4/1981 | Watson, Jr. | 525/467 |
| 4,304,923 | 12/1981 | Rousseau | 560/26 |
| 4,344,982 | 8/1982 | Chen | 427/44 |
| 4,377,679 | 3/1983 | Schmidle | 528/75 |
| 4,444,846 | 4/1984 | Zalucha et al. | 428/425.6 |
| 4,472,019 | 9/1984 | Bishop et al. | 350/96.3 |
| 4,474,830 | 10/1984 | Taylor | 427/54.1 |
| 4,512,340 | 4/1985 | Buck | 128/90 |
| 4,525,258 | 6/1985 | Watanabe et al. | 204/159.23 |
| 4,564,666 | 1/1986 | Fieder et al. | 522/33 |
| 4,581,407 | 4/1986 | Schmid | 524/548 |
| 4,608,400 | 8/1986 | Yokoshima et al. | 558/267 |
| 4,608,409 | 8/1986 | Coady et al. | 524/4,624,199 |
| 4,624,994 | 11/1986 | Ansel | 525/440 |
| 4,629,287 | 12/1986 | Bishop | 350/96.34 |
| 4,682,850 | 7/1987 | White et al. | 350/96.23 |
| 4,690,501 | 9/1987 | Zimmerman et al. | 350/96.29 |
| 4,690,502 | 9/1987 | Zimmerman et al. | 350/96.29 |
| 4,707,076 | 11/1987 | Skutnik et al. | 350/96.34 |
| 4,717,739 | 1/1988 | Chevreux et al. | 522/79 |
| 4,720,529 | 1/1988 | Kimura et al. | 522/97 |
| 4,741,958 | 5/1988 | Bishop | 428/394 |
| 4,761,136 | 8/1988 | Madhavan et al. | 522/79 |
| 4,783,544 | 11/1988 | Yokoshima et al. | 558/267 |
| 4,794,133 | 12/1988 | Moschovis et al. | 524/99 |
| 4,798,852 | 1/1989 | Zimmerman et al. | 522/96 |
| 4,849,462 | 7/1989 | Bishop | 522/97 |
| 4,902,440 | 2/1990 | Takeyama et al. | 522/96 |
| 4,932,750 | 6/1990 | Ansel et al. | 350/96.34 |
| 4,962,992 | 10/1990 | Chapin et al. | 350/96.23 |
| 4,973,611 | 11/1990 | Puder | 522/96 |
| 5,139,872 | 8/1992 | Lapin et al. | 428/375 |
| 5,199,098 | 3/1993 | Nolan et al. | 385/128 |
| 5,229,433 | 7/1993 | Schunck et al. | 522/96 |
| 5,336,563 | 8/1994 | Coady et al. | 428/375 |

FOREIGN PATENT DOCUMENTS

| | | |
|---|---|---|
| 2004407 | 12/1989 | Canada . |
| 0111280 | 6/1984 | European Pat. Off. . |
| 107845 | 5/1988 | Japan . |
| 239139 | 10/1988 | Japan . |
| 2047119 | 2/1990 | Japan . |
| 91/03499 | 3/1991 | WIPO . |

OTHER PUBLICATIONS

Chemical Abstract 11536r "Coating Materials for Optical Glass Fibers" MoriKawa et al, Oct. 1988.

*Primary Examiner*—Susan W. Berman
*Attorney, Agent, or Firm*—Roylance, Abrams, Berdo & Goodman

[57] ABSTRACT

Ultraviolet radiation-curable primary coating compositions for optical fibers are disclosed. The primary coatings comprise a polyether polyol-based reactively terminated aliphatic urethane oligomer; one or more diluent monomers terminated with at least one end group capable of reacting with the reactive terminus of the oligomer; an organofunctional silane adhesion promoter; and an optional photoinitiator. Also disclosed are optical fibers coated with the coatings of the invention, and processes for preparing same.

43 Claims, No Drawings

ORGANIC SOLVENT AND WATER RESISTANT HYDROLYTICALLY STABLE ULTRAVIOLET RADIATION CURABLE COATINGS FOR OPTICAL FIBERS

This is a continuation of application Ser. No. 08/169,544 filed Dec. 20, 1993, now abandoned, which is in turn a continuation of Ser. No. 07/873,105 filed on Apr. 24, 1992, now abandoned.

The present invention relates to radiation-curable primary coatings for optical fibers, to optical fibers containing such coatings and to processes for preparing optical fibers coated with the coatings of the invention.

Until recently, the optical fiber industry was concentrated on so-called "long haul" applications, wherein optical fibers were used to traverse long distances such as in transoceanic or transcontinental cables. In such applications, optical fibers required shielding with voluminous protective cabling material in sheltered subterranean or submarine environments and thus were not directly exposed to environmental hazards.

A recent trend in the optical fiber market is in local area networks for fiber-to-the-home uses. The fibers in such uses are directly exposed to much harsher conditions than previous applications of glass fibers, including severe temperature and humidity extremes. Consequently, previously used coatings do not perform well under such adverse conditions; hence, a need existed for the development of higher performance coatings. Such coatings needed to be able to withstand the above conditions, i.e., to possess thermal, oxidative and hydrolytic stability, to be resistant to moisture and to organic solvents and to protect the fiber over the long term, i.e., over twenty-five years' time.

Optical fibers used for light transmission can be prepared which, immediately after drawing, are exceptionally strong and have very few intrinsic defects. However, such pristine fibers are very easily flawed by exposure to environmental conditions including dust and moisture. Even a small flaw can reduce the strength of a fiber by an order of magnitude, rendering it brittle and easily broken by weak external forces. Therefore, optical glass fibers have, in the prior art, been clad with at least one resin coat immediately after their preparation, whose minimum requirement is to protect the underlying pristine fiber from such external forces.

Typically, at least two coatings, a primary, or buffer, coating and a secondary coating, have been used. In some cases, however, a monocoat, having properties intermediate to the typical primary and secondary coatings, is employed. In the case of a dual coat system, the inner, or primary, coating is applied directly to the glass fiber which, when cured, forms a soft, rubbery, compliant material which serves as a buffer to cushion and protect the fiber by relieving the stresses created when the fiber is bent, cabled or spooled. Such stress might otherwise induce microbending of the fibers and cause attenuation of the light traveling through them, resulting in inefficient signal transmission. The secondary coating is applied over the primary coating, and must function as a hard, tough protective outer layer, preventing damage to the glass fiber during processing and use.

Certain characteristics are desirable for the primary coating, and others for the secondary coating. For example, the primary coating must maintain adequate adhesion to the glass fiber during thermal and hydrolyric aging, yet be strippable therefrom for splicing purposes. It should resist swelling due to solvent exposure sufficiently to retain its own structural integrity and that of the secondary coating.

The modulus of the primary coating must be low to cushion and protect the fiber by readily relieving the stresses on the fiber which can induce microbending and consequent inefficient signal transmission. This cushioning effect must be maintained through the temperature range in which the fibers may be exposed throughout their lifetime. Thus, it is necessary for the primary coating to have a low glass transition temperature (Tg). This low glass transition temperature will ensure that the coating remains in its rubbery state throughout the possible use temperature range.

The primary coating should also have a relatively high refractive index, i.e., greater than that of the cladding material of the fiber to be coated. This high refractive index allows for a refractive index differential between the glass cladding and the primary coating. This differential allows errant light signals to be refracted away from the glass core.

Another requisite quality of the primary (buffer) coating is resistance to moisture. Moisture will rapidly degrade the strength of the coating itself as well as the underlying glass fibers under stress. The reaction is one of hydrolysis and stress corrosion. Moisture will also adversely affect the adhesion of the primary coating to the glass, resulting in possible delamination. It is therefore desirable for the coating to be as water resistant as possible. Preferably, the primary coating should have a water absorption value of less than 5% by weight, and more preferably less than 3% by weight.

Yet another desirable property for primary coatings is organic solvent resistance. Such solvents can cause the primary coating to swell so severely as to result in delamination of the coatings from the fiber, or to cause the more rigid secondary coating to crack and fall apart. Solvent exposure can be, in the case of "long haul" optical fiber cables, in the form of filling compounds (e.g., mineral oil-based or silicone-based materials), or, in the case of less protected fiber-to-the-home applications, various household solvents such as are present in cleaners, paints, insect repellents and so forth. Additionally, when such fibers are routed near filling stations, gasoline leakage may result in solvent exposure. Preferably, the coating should exhibit an increase in length due to swelling of less than about 40%, and more preferably, less than about 35%, after soaking in gasoline at room temperature for four hours, as a measure of organic solvent absorption.

It can be readily appreciated that the attainment of organic solvent resistance and water resistance are often at cross purposes, one more easily attained with a hydrophilic composition and the other with a hydrophobic composition, and thus difficulty achieved.

Furthermore, the coating should have optimized adhesion to its substrate, high enough that it will remain adhered thereto under use conditions, yet not so high as to impair strippability for splicing.

Similarly, the secondary coating must have a number of essential and optimal qualities. The secondary coating should function as a hard protective layer which allows the fiber not to be damaged during its processing and use, and thus should have a relatively high glass transition temperature (Tg) and a high modulus. Furthermore, like the primary coating, the secondary coating should undergo minimal changes in physical properties on exposure to organic solvents and moisture. Moreover, secondary coatings should have a low coefficient of friction (COF) to facilitate winding and unwinding of the fibers on spools and to allow the fibers to slide easily along each other in a cable structure, thus relieving stress, but not so low as to result in a reduced tendency to stay aligned on the spool.

Again, in monocoat applications, the single coating layer should optimally have certain properties intermediate those typically seen in primary and secondary coatings, i.e., with respect to modulus, Tg and refractive index.

Still other properties exist which are desirable in both primary and secondary coatings. For example, fiber manufacturers are motivated to coat the fibers as rapidly as possible to attain the economy of faster cure speeds, as these result in higher line speeds. The cure speeds of coating materials may be determined by constructing a UV dose versus modulus curve. The lowest UV dose at which the coating modulus exhibits dose independence is considered its cure speed. There is therefore a demand for faster curing coatings; for example, high line speeds are obtained with primary and secondary coatings which may be applied wet-on-wet and simultaneously ultraviolet light-cured. One way of doing this is described in U.S. Pat. No. 4,474,830, issued Oct. 2, 1984 to Carl R. Taylor, which patent is expressly incorporated herein by reference.

Another desirable objective for both primary and secondary UV-curable coatings is to minimize the amount of unbound material in the coating after cure. Even when the cured coatings are considered 100% solids, there may still exist a small amount of material which does not chemically bind into the polymer network on curing. Examples of such materials in the cured coatings include unreacted monomer, unreacted photoinitiator, certain non-functional additives and so forth. The presence of excessive amounts of such materials is undesirable, inasmuch as volatilization of such components over time may change the physical properties of the coating. For example, volatile materials from the primary coating may permeate into the secondary coating, tending to plasticize it and resulting in strength loss. Also, volatile materials may cause production of unpleasant odors.

Still other important qualities of both optical fiber coatings are viscosity and shelf life. Good shelf life is considered formulation stability of at least six to twelve months. Viscosity can typically be somewhat adjusted by regulation of the temperature at which the coatings are applied. However, it is advantageous to set the viscosity high enough so as to maintain proper theology and handling of the coating on application, but low enough to facilitate bubble release and to minimize the amount of heat needed in the preparation. Excessive heating is undesirable inasmuch as it may result in premature gelling or viscosity buildup due to possible thermal initiation of polymerization.

PRIOR ART COATINGS

Various single or double layer fiber coatings exist in the prior art. Among these are epoxy- or urethane-based resins. However, many of these resins cure slowly; have poor moisture or organic solvent resistance or poor hydrolytic, thermal and oxidative stability; and have undesirable yellowing properties.

There have also been developed primary (buffer) coatings which cure on exposure to ultraviolet radiation. Such prior art primary coatings, however, have conventionally not been very moisture resistant and have some of the same deficiencies as above. In general, coatings formulated for moisture resistance are not resistant to organic solvents, and vice versa.

To obviate these flaws, the primary-coated optical fibers of the prior art have been topcoated with a tough and flexible overcoat which possesses superior resistance to moisture and abrasion. Prior art coatings have included extruded nylon "jacket" coatings, which are, however, more expensive and more difficult to apply than would be an ultraviolet-cured coating.

There have recently been developed optical fiber coats which are very moisture resistant and which have excellent thermal, hydrolytic and oxidative stability. Applicant's U.S. Ser. No. 742,531, filed Aug. 8, 1991, (a continuation application of Ser. No. 350,239, filed May 11, 1989), now U.S. Pat. No. 5,146,531 teaches coating compositions prepared from acrylate or methacrylate based components, e.g., a primary coating including, inter alia, an acrylated urethane oligomer based on a hydrocarbon polyol; an alkyl acrylate monomer; and a photoinitiator, and a secondary coating including a polyester and/or polyether based acrylated urethane oligomer; an acrylated compound capable of adjusting viscosity; and a photoinitiator.

Applicant's U.S. Ser. No. 868,933, filed Apr. 16, 1992 (a continuation-in-part of the aforedescribed application), now U.S. Pat. No. 5,352,712, teaches that compositions analogous to those taught in its parent, but bearing any reactive end groups which do not adversely effect the cured coatings prepared from them, may be used. Each of these applications are expressly incorporated by reference herein.

While each of these compositions is suitably water resistant for most optical fiber coating uses, they are so hydrophobic as to not be resistant to some organic solvents to which the fiber may be exposed.

Therefore, the present invention seeks to provide a primary coating which, when cured, has maximal thermal, oxidative and hydrolytic stability, wherein the primary coating is adequately adherent to the glass fiber yet strippable therefrom; provides adequate cushioning of the fiber; has a relatively low glass transition temperature; and is capable of relieving stress upon the fiber. It should also be resistant to swelling by resisting solvent absorption and be moisture resistant as well.

SUMMARY OF THE INVENTION

It has now been discovered that a composition which, when cured, has excellent resistance to moisture and to organic solvents and concomitant swelling, as well as having excellent thermal, oxidative and hydrolytic stability, can be made.

Accordingly, the radiation-curable primary coating for an optical fiber of the present invention comprises, in one embodiment:

(A) from about 10 percent to about 90 percent by weight of a reactively terminated urethane oligomer which is the reaction product of (i) a polyether polyol; (ii) an aliphatic polyisocyanate; and (iii) an endcapping monomer capable of providing a reactive terminus;

(B) from about 5 percent to about 80 percent by weight of one or more monomer diluents which are terminated with at least one end group capable of reacting with the reactive terminus of (A);

(C) from about 0.1 percent to about 3.0 percent by weight of an organofunctional silane adhesion promoter; and (D) optionally, from about 1.0 percent to about 10.0 percent by weight of a photoinitiator, wherein all of the stated percentages are percentages by weight based on total weight of (A), (B), (C) and (D) and, preferably, wherein the composition, after radiation cure, exhibits an increase in length from swelling of no more than about 40 percent when soaked in gasoline at room temperature for four hours and a water absorption value, as defined herein, of no more than about 5% by weight.

Preferably, the reactive termini of (A) and (B) are acrylate or methacrylate.

The primary coating may optimally contain other materials, such as a chain transfer agent, preferably a mercapto-functional chain transfer agent, and one or more stabilizers.

A coated optical fiber has also been developed. In one embodiment, the optical fiber comprises an optical fiber coated with the primary coating layer as described above, and, in another, an optical fiber coated with primary and secondary coating layers.

A process for preparing a coated optical fiber has also been developed. In one embodiment, the process comprises applying to an optical fiber a primary coating layer as described above and radiation-curing the coating. In another embodiment, both a primary and a secondary coating layer are applied and radiation cured.

The coating compositions of the invention are also useful for other coating and protective purposes. They can be formulated to be useful on glass, ceramic, granite, and marble surfaces, and the like.

DESCRIPTION OF THE PREFERRED EMBODIMENTS

The invention relates in part to radiation-curable primary coatings for optical fibers. The optical fibers which are coated may comprise a glass core and a glass cladding layer. The core, for example, may comprise silica doped with oxides of germanium or phosphorus and the cladding, a pure or doped silicate such as fluorosilicate. Alternately, the fibers may comprise a polymer-clad silica glass core. Examples of such polymer claddings include organosiloxanes such as polydimethylsiloxane or a fluorinated acrylic polymer.

The primary coating, when cured, should have, inter alia, the following properties: moisture resistance; organic solvent resistance; ease of application; acceptable adhesion without compromising strippability; low volatiles content; low tensile modulus over the life of the fiber; low glass transition temperature; and long shelf life. Furthermore, it should be transparent; nonmalodorous; fast curing; and remain adherent, even upon aging in high heat and humidity environments. Additionally, the cured primary coating should maintain its excellent properties under accelerated aging conditions of increased temperature and humidity as a measure of its long term thermal, hydrolytic and oxidative stability.

The present invention involves the recognition that it is possible, through the judicious choice of ingredients and proportions, to formulate a primary coating composition meeting these criteria.

The primary coating composition of the present invention contains four basic ingredients, (A), (B), (C) and (D).

(A.) The Polyether Polyol-Based Oligomer

The first ingredient is a reactively terminated polyether polyol-based urethane oligomer (A). This component comprises from about 10 percent to about 90 percent by weight of the composition base on the total weight of the (A), (B), (C) and (D) ingredients of the composition. Preferably, this oligomer comprises from about 20 percent to about 80 percent, and more preferably from about 30 percent to about 70 percent by weight of the composition, based on the total weight of the (A) through (D) ingredients.

The particular oligomer used in the present invention is chosen to impart good thermal, oxidative and hydrolytic stability to the system, as well as to confer both moisture and organic solvent resistance.

It has been known in the art that various types of UV-curable oligomers exist which may yield a soft, compliant, low glass transition temperature-type coating. Acrylate-or methacrylate-terminated monomers are particularly commonly used due to their ease of cure upon ultraviolet radiation. One system known in the art is acrylate-end-capped polybutadiene-type rubber or rubber-modified acrylated monomers as base resins. While these systems have excellent low temperature properties and are hydrophobic for moisture resistance, their internal carbon-carbon double bonds (unsaturation) make them susceptible to oxidation over a long period of time.

It is also known in the art to employ acrylated silicones as base resins in such compositions. While these have good low temperature properties and hydrophobicity, they are difficult to formulate with a suitably high refractive index; tend to have poor thermal stability; and may be susceptible to hydrogen outgassing which can lead to signal attenuation in fibers so coated.

Yet another system known in the art involves the use of acrylated fluorocarbons. While these are hydrophobic and thermally stable, they are typically incompatible with most non-halogenated organic compounds. Additionally, they are very expensive relative to other systems.

To overcome many of the disadvantages of the prior art systems, it may be tried to utilize a urethane system based on one of a variety of backbones. In general, urethane acrylate systems based on polyethers or polyesters were usually characterized by poor water resistance and by thermal instability. Additionally, known urethane oligomers based on aromatic isocyanates displayed thermal instability and tended to yellow. While polyether-based urethane acrylates have excellent low Tg properties, when used alone, many are not hydrophobic enough for optical fiber applications and are susceptible to oxidation. Polyester-based urethane acrylates, on the other hand, have good thermal stability but are susceptible to hydrolysis.

Thus, the present invention uses an oligomer which, in combination with the other components of this invention, obviates many of the above problems.

The oligomer (A) utilized in the present invention is the reaction product of (i) a polyether polyol; (ii) an aliphatic polyisocyanate; and (iii) an endcapping monomer capable of supplying a reactive terminus.

The oligomeric component may contain very small amounts of urethane acrylates based on polyesters, but preferably contains only polyether-based oligomers, for optimal long term stability.

The polyether polyol is based on a straight chained or branched alkylene oxide of from one to about twelve carbon atoms. The polyether polyol may be prepared by any method known in the art.

The polyisocyanate component (ii) is non-aromatic. Oligomers based on aromatic polyisocyanates effect yellowing in the cured coating. Non-aromatic polyisocyanates of from 4 to 20 carbon atoms may be employed. Suitable saturated aliphatic polyisocyanates include but are not limited to isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl- 1,5-pentamethylene diisocyanate; 2,2'-dimethyl-1,5- pentamethylene diisocyanate; 3-methoxy-1,6-hexa-methylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; and mixtures thereof. Small amounts of aromatic polyisocyanates may be used; however, long term stability on aging may suffer somewhat.

The reaction rate between the hydroxyl-terminated polyol and the diisocyanate may be increased by use of a catalyst in the amount of 100 to 200 ppm. Suitable catalysts include but are not limited to dibutyl tin dilaurate, dibutyl tin oxide, dibutyl tin di-2-hexoate, stannous oleate, stannous octoate, lead octoate, ferrous acetoacetate, and amines such as triethylamine, diethylmethylamine, triethylenediamine dimethylethylamine, morpholine, N-ethyl morpholine, piperazine, N,N-dimethyl benzylamine, N,N-dimethyl laurylamine, and mixtures thereof.

The endcapping monomer (iii) may be one which is capable of providing at least one reactive terminus and which preferably provides acrylate or methacrylate termini. Suitable hydroxyl-terminated compounds which may be used as the endcapping monomers include but are not limited to hydroxyalkyl acrylates or methacrylates such as hydroxyethyl acrylate, hydroxyethyl methacrylate, hydrozypropyl acrylate hydroxypropyl methacrylate, hydroxybutyl acrylate, hydroxybutyl methacrylate, and so forth.

A particularly preferred endcapping monomer is hydroxyethyl acrylate or hydroxyethyl methacrylate.

The molar ratio of the polyol, diisocyanate and endcapping monomer is preferably approximately 1:2:2.

Some commercially available oligomers which are suitable for the (A) component of this invention include but are not limited to the following:

(1.) Echo Resins ALU-350 series resins, i.e., 350, 351, 352 and 353, from Echo Resins and Laboratory, Versailles, Mo., all polytetramethylene polyol-based acrylated aliphatic urethane oligomers of increasing molecular weight and viscosity and decreasing modulus with increasing number in the series. Certain physical properties for this series of resins are summarized below:

|  | ALU-350 | ALU-351 | ALU-352 | ALU-353 |
|---|---|---|---|---|
| Density @ 20° C. | | | | |
| (g/cm³) | 1.052 | 1.048 | 1.027 | 1.019 |
| (lbs/gal) | 8.76 | 8.73 | 8.55 | 8.49 |
| Refractive Index | 1.496 | 1.492 | 1.478 | 1.468 |
| Viscosity | | | | |
| @ 78° F. (cps) | 320,000 | 120,000 | wax | wax |
| @ 140° F. (cps) | 7,300 | 5,400 | 8,900 | 21,750 |
| Color, Gardner | <1 | <1 | <1 | <1 |
| Functionality | 2 | 2 | 2 | 2 |
| Percent Shrinkage, Cured | 3.6 | 2.8 | 1.7 | 1.3 |
| Relative Molecular Weight | 1.0 | 1.3 | 2.0 | 2.7 |

In general, the lower molecular weight members of the series are preferred because they appear to cause less solvent swelling in cured coatings including them.

The methacrylate equivalents of these oligomers are equally suitable.

(2) Purelast® aliphatic urethane acrylate oligomers based on polyether backbones, available from Polymer Systems Corporation, Orlando, Fla. Suitable Purelast® oligomers include 566, 566A, 569, 569A, 586, 586A, 590, 590A, 595, 595A, 597A and 598A. This series of oligomers increases in modulus with increasing number in the series. These oligomers are either difunctional (no suffix) or monofunctional ("A" suffix). All of these oligomers are sold neat, except for 597A and 598A, which include 7% and 10% isobornyl acrylate, respectively.

Methacrylate anologs of these oligomers are suitable as well.

(3) Ebecryl® 8800, Ebecryl® 270, and Ebecryl® 4826 oligomers, all from Radcure Specialties Inc., Louisville, Ky., all aliphatic urethane diacrylate oligomers based on polyethers.

Ebecryl® 8800 oligomer is diluted 10% with ethoxyethoxyethyl acrylate; has a viscosity at 65° C. of 8000–18,000 cps and a Gardner Color Index of 2 max. Its density is 8.75 pounds per gallon; its theoretical functionality is 2.5 and its theoretical molecular weight is 1700. When cured it has a tensile strength of 3150 psi; a tensile elongation of 83%, and a glass transition temperature of 48° C.

Ebecryl® 270 oligomer, previously sold as Ebecryl® 4826 oligomer, contains no diluent monomer; has a viscosity of 2500–3500 cps at 60° C. and a Gardner Color Index of 2 max. Its density is 8.91 pounds per gallon; its theoretical functionality is 2 and its theoretical molecular weight is 1500. When cured it has a tensile strength of 1200 psi; a tensile elongation of 87% and a glass transition temperature of −27° C.

Methacrylate equivalents of these oligomers may also be used.

(4) Uvithane® ZL-1178 oligomer from Morton Thiokol, Inc., Morton Chemical Division, Princeton, N.J., polyether based aliphatic urethane acrylate. This oligomer has a viscosity of 55–75 poises at 120° F. and 700–800 poises at 78° F. and, when cured neat, has a tensile strength of 325 psi and an ultimate elongation of 45%.

The methacrylate analog of this monomer may be used as well.

(5) Furthermore, any polyether-based aliphatic urethane acrylate or methacrylate oligomer of the type exemplified above is believed to be suitable so long as the desirable properties of the claimed composition are not adversely effected.

The primary coating containing the oligomer of this invention has a water absorption value of less than about 5% by weight, and preferably less than about 3%. Furthermore, the coating should swell less than 40% in length, and preferably less than about 35% in length, when soaked in gasoline for about 4 hours at room temperature.

(B.) The Diluent Monomer

The second essential component of the composition is a diluent monomer which is terminated with at least one end group capable of reacting with the reactive terminus of (A). Again, this terminus is preferably acrylate or methacrylate.

The monomer is selected to be one that will adjust the total primary coating composition to a viscosity in the range of about 1,000 cps (centipoises) to about 10,000 cps, and preferably in the range of about 4,000 cps to about 8,000 cps, measured by a Brookfield viscometer, model LVT, spindle speed of 6 rpm, spindle #34, at 25° C. Additionally, it is chosen to be soft-curing and to have a low Tg, thus lowering the Tg of the composition. Furthermore, a specific diluent may be chosen which is capable of adjusting the refractive index of the whole composition, as will be further discussed below.

The monomer (B) comprises from about 5 percent to about 80 percent by weight of the composition, based on the total weight of (A), (B), (C) and (D). Preferably, it comprises from about 10 percent to about 70 percent, and more preferably from about 10 percent to about 60 percent by weight of the composition, based upon the total weight of (A), (B), (C) and (D).

This diluent monomer may be either straight chained or branched, and should preferably be at least partially aliphatic. One type of diluent which may be used is an alkyl acrylate or methacrylate having about 6 to 18 carbon atoms in the alkyl moiety of the molecule.

Suitable examples of such monomers include but are not limited to acrylates land methacrylates such as hexyl acrylate; hexyl methacrylate; 2-ethylhexyl acrylate; 2-ethylhexyl methacrylate; isooctyl acrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; $C_{14}$–$C_{15}$ hydrocarbon diol diacrylates; $C_{14}$–$C_{15}$ hydrocarbon diol dimethacrylates; and mixtures of the above.

Preferred alkyl acrylate monomers include stearyl acrylate, lauryl acrylate and isodecyl acrylate. A particularly preferred one is lauryl acrylate.

As mentioned above, the diluent monomer may also be one which is capable of adjusting the refractive index of the composition. Such monomers, when used, may, for example, contain (1) an aromatic moiety; (2) a moiety providing a reactive (e.g., acrylic or methacrylic) group; and (3) a hydrocarbon moiety.

The aromatic moiety of such refractive index modifying monomer (B) is itself capable of raising the refractive index; however, the hydrocarbon moiety may, assist in increasing the compatibility of this monomer with the oligomer (A). The moiety providing a reactive group (e.g., an acrylate or methacrylate group) renders the compound compatible with the system as a whole, inasmuch as it has available reactive termination which allows it to crosslink with the rest of the composition upon ultraviolet curing, thus minimizing the volatiles content of the cured system. Samples of aromatic monomers additionally containing hydrocarbon character and a vinyl group include but are not limited to polyalkylene glycol nonylphenylether acrylates such as polyethylene glycol nonylphenylether acrylate or polypropylene glycol nonylphenylether acrylate; polyalkylene glycol nonylphenylether methacrylates such as polyethylene glycol nonylphenylether methacrylate or polypropylene glycol nonylphenylether methacrylate; and mixtures of these.

In each case, the phenyl group serves to increase the refractive index of the coating and the nonyl component renders the composition somewhat more compatible with the aliphatic oligomer (A). This monomer is capable of increasing the refractive index of the composition relative to that of a composition comprising only (A), (C) and (D). A suitable primary coating composition may, for example, have a refractive index of greater than or equal to about 1.48.

The refractive index of the primary coating must be higher than that of the cladding of the fiber. If the fibers coated with the coating composition of the present invention are down-doped, i.e., contain dopants which lower the refractive index of the fiber itself, the refractive index of the coating will be different enough from that of the fiber so that errant signals will be refracted away even without the incorporation of this component. Therefore, in such embodiments, a refractive index modifying monomer is not essential to the composition and other diluents may instead be used.

Further, the diluent monomer may be any of those known in the art, which do not adversely affect the composition. In a preferred embodiment, the diluent monomer component (B) comprises a mixture of oligomers, e.g., a small portion of a monomer capable of adjusting the refractive index and the balance of an alkyl acrylate or methacrylate which is wholly aliphatic, optimizing compatibility and stability.

(C.) The Adhesion Promoter

The third ingredient is an organofuntional silane adhesion promoter (C). Adhesion becomes a particularly pertinent problem in high humidity and high temperature environments, where delamination is more of a risk. In very protected environments, this component may be optional, such as in conditions of low humidity (i.e., below 50% relative humidity) and low temperature (i.e., below 25° C.).

It is known in the art to use either acid-functional materials or organofunctional silanes to promote adhesion of resins to glass. While acid-functional materials are operative herein, organo-functional silanes are preferred. Acid-functional materials are less preferred because of their possible corrosivity towards the materials, and their tendency to lose their adhesion properties on exposure to moisture. Silanes tend to be much more suitable in terms of these factors and, therefore, are the adhesion promoters of choice. Additionally, it is useful to have an adhesion promoter having a functionality which binds in with the system during cure, to maximize its adhesion promotion as well as to minimize the quantities of unbound volatiles.

Various suitable organofunctional silanes include but are not limited to amino-functional silanes; acrylamido functional silanes; allyl-functional silanes; vinyl-functional silanes; acrylate-functional silanes; methacrylate-functional silanes; and mercapto-functional silanes. The adhesion promoters preferably are methoxy-or ethoxy-substituted as well.

Preferred organofunctional silanes include but are not limited to mercaptoalkyl trialkoxy silane, methacryloxyalkyl trialkoxy silanes, aminoalkyl trialkoxy silane, vinyl alkoxy silane, mixtures thereof, and the like. Methacrylated silanes are desirable, inasmuch as they bind in well with the cured system, but tend to slow down the cure speed of the system. The mercaptofunctional adhesion promoters also chemically bind in during cure, but do not appreciably slow down the cure speed of the system. Allyl-functional and vinyl-functional silanes are also desirable when they are chosen to bind in well with the system used.

Some preferred organofunctional silanes that enhance adhesion in humid conditions include but are not limited to vinyl-tris-(2-methoxyethoxy silane), 3-aminopropyl triethoxy silane, 3-methacryloxypropyl-trimethoxy silane, 3-mercaptopropyl trimethoxy silane, 3-mercaptopropyl-(gamma-mercaptopropyl)triethoxy silane, vinyl triacetoxy silane, beta-(3,4-epoxycyclohexyl) ethyl trimethoxy silane, gamma-glycidoxypropyl trimethoxy silane, 3-vinylthiopropyl trimethoxy silane, and mixtures thereof. A particularly preferred adhesion promoter is vinyl-tris-(2-methoxyethoxy silane).

The silane component, when used, should be incorporated into the composition in a small but effective amount to enhance the adhesion of the composition to the surface of an inorganic substrate, which, in the preferred embodiment, is glass fiber, and in other embodiments, may be glass, enamel, marble, granite or the like. The silane component, when used, comprises from about 0.1 percent to about 3.0 percent by weight of the composition, based on total weight of the ingredients (A), (B) (C) and (D). Preferably, the silane comprises from about 0.2 percent to about 2.0 percent, and more preferably from about 0.3 percent to about 1.0 percent, based on the total weight of the oligomer, diluent monomer, silane and photoinitiator.

(D.) The Photoinitiator

A fourth ingredient of the primary coating composition is an optional photoinitiator (D). This ingredient is only required in embodiments wherein the coating is to be ultraviolet radiation-cured; in other embodiments, such as wherein electron beam cure is envisioned, the photoinitiator may be omitted. The photoinitiator, when used in a small but effective amount to promote radiation cure, must provide reasonable cure speed without causing premature gelation of the composition. Further, it must not interfere with the optical clarity of the cured optical coating. Still further, the photoinitiator must itself be thermally stable, and non-yellowing and efficient.

Suitable photoinitiators include but are not limited to the following: hydroxycyclohexylphenyl ketone; hydroxymethylphenyl propanone; dimethoxyphenylacetophenone; 2-methyl-1-[4-(methylthio) phenyl]-2-morpholino-propanone-1; 1-(4-isopropylphenyl)-2-hydroxy-2-methylpropan-1-one; 1-(4-dodecylphenyl)-2-hydroxy-2-methylpropan-1-one; 4-(2-hydroxyethyoxy)phenyl-2(2-hydroxy-2-propyl)ketone; diethoxyphenyl acetophenone; and mixtures of these.

The photoinitiator preferably comprises from about 1.0 percent to about 10.0 percent by weight of the composition, based upon the total composition of the (A) through (D) ingredients. Preferably, the amount of photoinitiator is from about 1.5 percent to about 8.0 percent, and more preferably from about 2.0 percent to about 7.0 percent by weight, based upon total weight of (A), (B), (C) and (D) ingredients.

A particularly preferred photoinitiator is hydroxycyclohexylphenyl ketone. The photoinitiator should be chosen such that a cure speed, as measured in a dose versus modulus curve, of less than 1.0 J/cm$^2$, and preferably less than 0.5 J/cm$^2$, is required, when the photoinitiator is used in the designated amount.

Other Optional Components

Various optional components may be used in the primary coating beyond the (A) through (D) components which are described above. For example, optional chain transfer agents (E) may be used to control the modulus and glass transition temperature of the coating. One way known in the art to control the molecular weight and, consequently, the modulus and glass transition temperature of a polymerization product is to use one or more chain transfer agents. The addition of a chain transfer agent to a formulation lowers the molecular weight of a polymer produced and results in a lower modulus, lower glass transition temperature coating.

Preferred chain transfer agents are mercapto compounds, optionally having a hydrocarbon chain of at least eight carbon atoms. Examples of suitable mercapto chain transfer agents include but are not limited to methyl thioglycolate; methyl-3-mercaptopropionate; ethyl thioglycolate; butyl thioglycolate; butyl-3-mercaptopropionate; isooctyl thiogly- colate; isooctyl-3-mercaptopropionate; isodecyl thioglycolate; isodecyl-3- mercaptopropionate; dodecyl thioglycolate; dodecyl-3-mercaptopropionate; octadecyl thioglycolate; and octadecyl-3-mercaptopropionate. Parathiocresol; thioglycolic acid; and 3-mercaptopropionic acid may also be used, but may display some incompatibility with the resin and may produce odor problems. In general, lower molecular weight chain transfer agents are preferred.

A particularly preferred chain transfer agent is isooctyl-3-mercaptopropionate (IOMP).

The chain transfer agent may, if used, comprise from about 0.1 percent to about 10.0 percent by weight of the composition based upon the total weight of ingredients (A) through (D). Preferably, the chain transfer agent comprises from about 0.25 percent to about 9.0 percent by weight, and still more preferably from about 0.5 percent to about 8.0 percent by weight, based on the total weight of the (A), (B), (C) and (D) components.

To improve shelf life (storage stability) of the uncured coating, as well as to increase thermal and oxidative stability of the cured coating, one or more stabilizers (F) may be included in the composition. Examples of suitable stabilizers include tertiary amines such as diethylethanolamine, diethyl hydroxyl amine and trihexylamine; hindered amines; organic phosphites; hindered phenols; mixtures thereof; and the like. Some particular examples of antioxidants which can be used, alone or in combination, include but are not limited to octadecyl-3(3',5'-di-tert-butyl-4'-hydroxyphenyl) propionate; thiodiethylene bis (3,5-di-tert-butyl-4-hydroxy) hydrocinnamate; butylated paracresol-dicyclopentadiene copolymer and tetrakis [methylene (3,5-di-tert-butyl-4-hydroxyhydrocinnamate)] methane. Additionally, certain silanes in small quantities, e.g., as low as 0.0001 percent to 0.01 percent by weight, may be used as stabilizers. An example of a suitable silane is 3-aminopropyl trimethoxysilane.

When a stabilizer is used, it may be incorporated in a total amount of from about 0.0001 percent to about 3.0 percent, based on the weight of the (A) through (D) ingredients. Preferably, it is included in the range from about 0.25 percent to about 2.0 percent by weight, and more preferably in the range from about 0.5 percent to about 1.5 percent by weight, based on the total weight of the (A) through (D) ingredients. Desirable properties of a stabilizer include (1) non-migration (probably enhanced by low polarity and high molecular weight) and (2) basicity (to allow it to help in neutralizing residual acid which might prematurely initiate polymerization). Preferred stabilizers include thiodiethylene bis (3,5-di-tert-butyl-4-hydroxy) hydrocinnamate and 3-aminopropyl trimethoxysilane.

PREFERRED COMPOSITIONS

Preferred primary compositions for coating an optical fiber, then, comprise the following:

(A) from about 30 percent to about 70 percent by weight of an aliphatic urethane acrylate oligomer having as a backbone polytetramethylene polyol;

(B) from about 10 percent to about 60 percent by weight of polypropylene glycol nonylphenylether acrylate;

(C) from about 0.3 percent to about 1.0 percent by weight of vinyl-tris-(2-methoxyethoxy silane) adhesion promoter;

(D) from about 2.0 percent to about 7.0 percent by weight of hydroxycyclohexylphenyl ketone photoinitiator;

(E) from about 0.5 percent to about 8.0 percent by weight of isooctyl-3-mercaptopropionate, a chain transfer agent;

(F) from about 0.5 percent to about 1.5 percent of thiodiethylene bis-(3,5-di-tert-butyl-4-hydroxy) hydrocinnamate stabilizer; and (G) from about 0.0001 to about 0.01 percent by weight of 3-aminopropyl trimethoxy silane stabilizer, wherein all of the stated percentages are percentages by weight, based upon total weight of (A) through (D), inclusive, and wherein the composition, after radiation cure, exhibits an increase in length from swelling of no more than about 40 percent when soaked in gasoline at room temperature for four hours and a water absorption value, as described in Example I, below, of no more than about 5% by weight.

Two other preferred primary coatings are ones wherein the (B) component, above, comprises either a mixture of polyethylene glycol nonylphenylether acrylate with lauryl acrylate or polyethylene glycol nonylphenylether acrylate alone.

The primary coating of this invention may either be topcoated with a secondary coating as known in the art, or may, in some cases, if tailored to be suitable therefor, be a monocoat wherein only this primary coating is required. A suitable secondary optical fiber coating, when used, optimally possesses good thermal, oxidative and hydrolytic stability; hardness; high modulus; high glass transition temperature; and high refractive index.

An optional secondary coating may be applied atop the primary coatings of the invention. Suitable secondary coatings are those which are known in the art, including but not limited to those disclosed in copending application U.S. Ser. No. 868,933, filed Apr. 16, 1992, now U.S. Pat. No. 5,352,712, (incorporated herein by reference).

Such secondary coating may, for example, comprise from about 10 percent to about 90 percent by weight of an aliphatic urethane oligomer based on a polyester and/or polyether and containing a reactive terminus; from about 20 percent to about 60 percent by weight of a hydrocarbonaceous viscosity-adjusting component capable of reacting with the reactive terminus of the oligomer; and optionally, from about 0.05 percent to about 10.0 percent by weight of a photoinitiator.

One preferred secondary coating may comprise from about 40 percent to about 80 percent by weight of a mixture of aliphatic urethane acrylate oligomers based on polyether backbones; from about 25 percent to about 50 percent by weight of a mixture of isobornyl acrylate and hexanediol diacrylate; and from about 2.0 percent to about 7.0 percent by weight of hydroxycyclohexylphenyl ketone photoinitiator.

PREPARATION OF A COATED OPTICAL FIBER

The invention also relates to a process for preparing a coated optical fiber. The process comprises (1) applying to an optical glass fiber a primary coating composition layer comprising (A) from about 10 percent to about 90 percent by weight, based upon total weight of (A), (B), (C) and (D), of a reactively terminated urethane oligomer which is the reaction product of (i) a polyether polyol; (ii) an aliphatic polyisocyanate; and (iii) an endcapping monomer capable of supplying a reactive terminus;

(B) from about 5 percent to about 80 percent by weight, based upon total weight of (A), (B), (C) and (D), of one or more monomer diluents terminated with at least one end group capable of reacting with the reactive terminus of (A);

(C) from about 0.1 percent to about 3.0 percent by weight of an organofunctional silane adhesion promoter; and (D) optionally, from about 1.0 percent to about 10.0 percent by weight, based upon total weight of (A), (B), (C) and (D), of a photoinitiator, wherein the composition, after radiation cure, exhibits an increase in length from swelling of no more than about 40 percent when soaked in gasoline at room temperature for four hours and a water absorption value of no more than about 5% by weight; and (2) radiation-curing said coating in situ.

The reactive termini of (A) and (B) are preferably selected from acrylate and methacrylate.

In one embodiment, the process comprises applying only the primary coating of the invention to the optical fiber and radiation-curing the coating in situ.

In an alternative embodiment, a secondary coating may be applied atop the primary coating of this invention, and the two coatings simultaneously radiation cured.

The primary and/or secondary coatings may be applied and cured by any method known in the art. A preferred method, whereby two coatings are applied wet-on-wet, is disclosed in U.S. Pat. No. 4,474,830 to C. Taylor of AT&T Bell Laboratories. The coating or coatings may then be cured in situ, preferably by ultraviolet irradiation, to obtain a cured polymeric coating. Alternatively, the primary coating may be applied and cured, after which the secondary coating may be applied and cured.

COATED OPTICAL FIBERS OF THE INVENTION

The invention further relates to optical fibers, and especially to glass optical fibers, that are coated with the primary coating of this invention alone, or coated with the primary coating of this invention and a secondary coating.

In one embodiment, the invention is a coated optical fiber comprising:

(a) a glass optical fiber;

(b) a radiation cured primary coating layer comprising the cured reaction product of:

(A) from about 10 percent to about 90 percent by weight of a reactively terminated urethane oligomer which is the reaction product of (i) a polymer polyol, (ii) an aliphatic polyisocyanate, and (iii) an endcapping monomer capable of supplying a reactive terminus;

(B) from about 5 percent to about 80 percent by weight of one or more monomer diluents which are terminated with at least one end group capable of reacting with the reactive terminus of (A);

(C) from about 0.1 to about 3.0 percent by weight of an organofunctional silane adhesion promoter; and (D) optionally, from about 1.0 percent to about 10.0 percent by weight of a photoinitiator, wherein all of the stated percentages are precentages by weight based on total weight of (A), (B), (C) and (D); and (c) a radiation cured secondary coating layer comprising the cured reaction product of (I) from about 10 percent to about 90 percent by weight of an aliphatic urethane oligomer based on a polyester and/or polyether and containing a reactive terminus;

(II) from about 20 percent to about 60 percent by weight of hydrocarbonaceous viscosity-adjusting component capable of reacting with the reactive terminus of (I);

(III) optionally, from about 0.05 percent to about 10.0 percent by weight of a photoinitiator, wherein all of the stated percentages are percentages by weight based on total weight of (I), (II) and (III).

In a preferred embodiment, the invention is a coated optical fiber comprising:

(a) a glass optical fiber;

(b) a radiation-cured primary coating layer comprising the cured reaction product of (A) from about 10 percent to about 90 percent by weight of an acrylated or methacrylated urethane oligomer which is the reaction product of (i) a polyether polyol; (ii) an aliphatic polyisocyanate; and (iii) an endcapping monomer selected from the group consisting of hydroxyalkylacrylate and hydroxyalkylmethacrylate;

(B) from about 5 percent to about 80 percent by weight of one or more acrylate or methacrylate monomer diluents;

(C) from about 0.1 percent to about 3.0 percent by weight of an organofunctional silane adhesion promoter; and (D) optionally, from about 1.0 percent to about 10 percent by weight of a photoinitiator, wherein all of the stated percentages are percentages by weight based on total weight of (A), (B), (C) and (D); and (c) a radiation-cured secondary coating layer comprising the cured reaction product of (I) from about 40 percent to about 80 percent by weight of a mixture of aliphatic urethane acrylate oligomers based on polyether backbones;

(II) from about 25 percent to about 50 percent by weight of a mixture of isobornyl acrylate and hexanediol diacrylate; and (III) from about 2.0 percent to about 7.0 percent by weight of hydroxycyclohexylphenyl ketone photoinitiator; and wherein all of the stated percentages are percentages by weight based on the total weight of (I), (II) and (III).

In another preferred embodiment, the invention is a coated optical fiber comprising (a) a glass optical fiber;

(b) a radiation-cured primary coating layer comprising the cured reaction product of (A) from about 30 percent to about 70 percent by weight of an aliphatic urethane acrylate oligomer having as a backbone a tetramethylene polyol;

(B) from about 10 percent to about 60 percent by weight of polypropylene glycol nonylphenylether acrylate;

(C) from about 0.3 percent to about 1.0 percent by weight of vinyl-tris-(2-methoxyethoxy silane) adhesion promoter; and (D) from about 2.0 percent to about 7.0 percent by weight of hydroxycyclohexylphenyl ketone photoinitiator, wherein all of the stated percentages are percentages by weight, based upon total weight of (A), (B), (C) and (D); and (c) a radiation-cured secondary coating layer comprising the cured reaction product of (I) from about 40 percent to about 80 percent by weight of a mixture of aliphatic urethane acrylate oligomers based on polyether backbones;

(II) from about 25 percent to about 50 percent by weight of a mixture of isobornyl acrylate and hexanediol diacrylate; and (III) from about 2.0 percent to about 7.0 percent by weight of hydroxycyclohexylphenyl ketone photoinitiator; and wherein all of the stated percentages are percentages by weight based on the total weight of (I), (II) and (III).

The primary coating surrounding the fiber forms a cured polymeric material preferably having a glass transition temperature (Tg) of about −20° C. and preferably lower, i.e., about −30° C., or even lower.

The primary coating has an optimized adhesion to its substrate, high enough to remain adhered thereto under use conditions, yet not so high as to impair strippability for splicing. Preferably, the coating will require between about 10 and about 200 grams of force to peel it from a glass substrate at 50% relative humidity, and between about 5 and about 100 grams of force at 95% relative humidity. It should be appreciated, however, that, in embodiments where stripping and splicing are limited, such as in transoceanic cables, even higher peel forces may be acceptable. It should also be appreciated that peel force is not a precise, but rather a general, indicator of strippability from glass fibers.

When cured, the coating of the invention confers extraordinary thermal, hydrolytic and oxidative stability to the fiber and relieves stress thereon. Such long term stability is evidenced by acceptable performance under accelerated aging conditions of increased temperature and humidity. Additionally, the coating has excellent resistance to both water and gasoline absorption, and the fiber so coated is otherwise well protected from environmental damage. Specifically, the coating exhibits an increase in length from swelling (as a measure of solvent penetration) of no more than about 40% when soaked in gasoline at room temperature for four hours, and preferably no more than about 35%, and a water absorption value of no more than about 5% by weight, and preferably no more than about 3% by weight, when tested in the manner described in Example I, infra.

The coating compositions of the present invention have been disclosed hereinabove for use as optical fiber coatings. However, it is to be understood that these coatings may be used in any embodiment wherein stable, water and solvent resistant coatings are desired, especially for coating the surface of all optically useful article. For example, the coatings may be used for such diverse end uses as coating sheet glass (i.e., in the preparation of safety glass) to coating vinyl materials (e.g., in preparing no-wax floors). Other optically useful articles which may be prepared include but are not limited to photoswitches, photorelay devices, microelectronic devices, photocoupling devices, and so forth.

EXAMPLES

The following Examples serve to further illustrate the invention. In these Examples and elsewhere throughout this application, all parts and percentages are by weight, on a dry solids basis, and all temperatures are in degrees centigrade unless expressly stated to be otherwise. In all of the Examples, cure doses were measured with an International Light IL 745-A radiometer with model A309 light bug. Unless otherwise noted, throughout the Examples and the remainder of this application, "modulus" refers to 2.5% tensile modulus, measured using an Instron tensile tester. Unlike in the remainder of the application, where percentage by weight referred to the total weight of the (A) through (D) ingredients, parts by weight in the Examples refers to the total composition described in that Example, including all components. The optional ingredients are identified by an asterisk (*) in the Examples. It should be noted that, although the specification teaches that the photoinitiator is optional, it is required in the Examples, all of which employ ultraviolet cure. The other components are essential for use, if the exemplified coating is to meet the rigorous requirements for a commercially acceptable coating for optical glass fiber.

EXAMPLE I

A Primary Coating Having Good Organic Solvent and Water Resistance Which is Thermally, Hydrolytically and Oxidatively Stable The following composition was formulated:

| Ingredient | Parts by Weight |
| --- | --- |
| ALU-351 polyether-based aliphatic urethane acrylate oligomer based on polytetramethylene polyol (from Echo Regins and Laboratory, Versailles, MO) (A) | 60.0 |
| Aronix M-111 polyethylene glycol nonylphenylether acrylate monomer (from Toagasei Chemical Industry Company Ltd., Tokyo, Japan) (B) | approx. 21.00 |
| lauryl acrylate monomer (B) | 4.20 |
| A-172 vinyl-tris-(2-methoxyethoxy silane) adhesion promoter (from Union Carbide Corp., Danbury, CT.) (C) | 0.80 |
| Irgacure 184 hydroxycyclohexyl phenyl ketone photoinitiator (from Ciba Geigy Corp., Hawthorne, NY.) (D) | 6.00 |
| Isooctyl 3-mercaptopropionate chain transfer agent (E)* | 7.00 |
| Irganox 1035 thiodiethylene bis-(3,5-di-tert-butyl-4-hydroxy) hydrocinnamate antioxidant and thermal stabilizer (from Ciba Geigy) (F)* | 1.00 |
| A-1110 3-aminopropyl trimethoxysilane shelf stabilizer (from Union Carbide) (F)* | 0.00375 |

The uncured coating composition had the following viscosity values at these temperatures, measured by a Brookfield viscometer, model LVT, 6 rpm, #34 spindle: 4250 cps at 25° C.; 3360 cps at 28° C.; 2810 cps at 30° C.; 1940 cps at 35° C.; and 1305 cps at 40° C. The uncured composition had a refractive index of 1.4870 at 24.2° C. and a density of 8.66 lb/gal (1.04 g/cc).

A 6 mil coating of this composition was applied to a flat glass sheet using a Bird applicator and cured in air at 0.7 J/cm$^2$ using a 200 watts per inch medium pressure mercury vapor lamp.

Oxidative induction temperature was measured as follows. A sample of the above coating was subjected to differential scanning calorimetry under oxygen at a flow rate of 20 cc/min. Approximately 10 milligram samples were heated in open pans by increasing the temperature at a rate of 10° C./minute from 100° C. to exotherm. The oxidative inductive temperature, or the point at which the exotherm began, was 200° C.

The cured film had a rupture strength of 91.1 psi; elongation at break of 67.5%; TGA volatiles content of 6.53%; and a cured film refractive index of 1.4974 at 24.2° C. Its glass transition temperature, as measured by differential scanning calorimetry, was broad and indistinct. Its cure ratio (ratio of 2.5% moduli at 25° C. when cured in air at 0.2 J/cm$^2$ and at 0.7 J/cm$^2$, respectively) was 79.7%.

The effect of temperature on 2.5% modulus of the cured film was as follows: 25° C.:190.1 psi; 0° C.: 178.0 psi; −20° C.:403.7 psi; −40° C.:21,643.0 psi; and −60° C.:188,003.0 psi.

Water absorption of the sample was measured as follows. The cured film was equilibrated at 50% (±5%) relative humidity and 23° C. (±2° C.) for 48 hours. After this conditioning, the sample was weighed and a weight "A" recorded. The sample was then soaked for 24 hours at 25° C. in distilled water, then patted dry and weighed; this weight was recorded as "B". The sample was next placed in a vacuum desiccator under 10 mmHg pressure at 25° C. for 24 hours, removed and again equilibrated at 50% (±5%) relative humidity and 23° C. (±2° C.) for 48 hours and weighed; this third weight was recorded as "C". Percent water absorption measured as B-C/A×100 was about 1.78% for an average of three samples. This value is referred to as the water absorption value.

Other samples of this 6 mil thick coating were tested as follows to determine the effect of accelerated aging on various properties. Samples were conditioned for 48 hours at 50% (±5%) relative humidity and 25° C. (±2° C.). The samples were then placed on clips and hung in an environmental chamber under the following accelerated aging conditions:

(1) 125° C. for 7 days;

(2) 93.3° C. for 10 days;

(3) 93.3° C. for 10 days at 95% relative humidity (RH);

(4) 93.3° C. for 30 days; and (5) 93.3° C. for 30 days at 95% relative humidity.

After the designated time period, the samples were removed and equilibrated at 23° C. (±2° C.) and 50% (±5%) relatively humidity for 48 hours. The samples were then weighed and the following properties were recorded:

|  | 125° C. 7 days | 93.3° C. 10 days | 93.3° C. 10 days 95% RH | 93.3° C. 30 days | 93.3° C. 30 days 95% RH |
| --- | --- | --- | --- | --- | --- |
| weight change (%) | −7.16 | −6.32 | −1.98 | −6.40 | −2.63 |
| 2.5% mod. at 25° C. (psi) | 192.2 | 204.8 | 194.3 | 203.0 | 145.8 |
| 2.5% modulus change (%) at 25° C. | −8.4% | −2.4% | −7.4% | −3.2% | −30.5% |
| rupture strength (psi) | 98.6 | 109.6 | 88.0 | 97.2 | 71.4 |
| % elongation at break | 78.1 | 84.1 | 69.3 | 70.1 | 73.2 |

Glass adhesion was measured using a normalized peel test in the following manner. A 3 mil coating of this composition was applied to a microscope slide and cured in air at 0.7 J/cm$^2$. A 3 mil coating of a liquid secondary coating was then applied atop this and cured in the same manner. A one-inch slit was made down the center of the slide and the slide conditioned at 23° C. (±2° C.) and 50% (±5%) relative humidity for 24 hours and then put in the jaws of an Instron tensile tester, crosshead speed set at 20 mm/min, to measure peel force at 50% relative humidity. For testing peel at 95% relative humidity, the slide was conditioned for a further 24 hours at 95% (±5%) relative humidity and then tested with the Instron as above. About 68 grams of force were required to peel the coating at 50% relative humidity and about 25 grams at 95% relative humidity.

Solvent resistance was measured by conducting a swell test wherein a film sample was soaked in gasoline for four hours at room temperature and length change measured. A percent change of 34.0 was noted.

EXAMPLE II

Another Coating Having Excellent Organic Solvent and Water Resistance and Good Thermal, Hydrolytic and Oxidative Stability, Though Somewhat Poorer Strippability A coating composition was made up as follows:

| Ingredient | Parts by Weight |
|---|---|
| ALU-351 polyether based aliphatic urethane acrylate oligomer based on polytetramethylene polyol (from Echo Resins and Laboratory) (A) | 56.00 |
| M-111 polyethylene glycol nonylphenylether acrylate monomer (from Toagasei Chemical Industry Company) (B) | 29.99 |
| A-172 vinyl-tris-(2-methoxyethoxy silane) adhesion promoter (from Union Carbide) (C) | 1.00 |
| Irgacure 184 hydroxycyclohexylphenyl ketone photoinitiator (from Ciba Geigy) (D) | 6.00 |
| Isooctyl 3-mercaptopropionate chain transfer agent (E) | 6.00 |
| Irganox 1035 thiodiethylene bis-(3,5-di-tert-butyl-4-hydroxy) hydrocinnamate antioxidant and thermal stabilizer (from Ciba Geigy) (F) | 1.00 |
| A-1110 3-aminopropyl trimethoxysilane shelf stabilizer (from Union Carbide) (F) | 0.01 |

This coating composition, before cure, had the following temperature/viscosity profile, measured by a Brookfield viscometer, model LVT, 6 rpm, #34 spindle: 4720 cps at 25° C.; 3780 cps at 28° C.; 3070 cps at 30° C.; 2060 cps at 35° C.; and 1385 cps at 40° C. The liquid composition had a refractive index of 1.4908 at 25° C. and a density of 8.58 lb/gal (1.03 g/cc).

A 6 mil coating of this composition was cast and cured as in Example I.

The cured film of this Example had a rupture strength of 82.6 psi; elongation at break of 57.4%; TGA volatiles content of 6.37%; oxidative induction temperature of 205° C.; and a cured film refractive index of 1.5014 at 25° C. Its glass transition temperature was −31.7° C. (midpoint) (−35.8° C. onset) and its cure ratio (as described in Example I) was 85.9%.

The effect of temperature on 2.5% modulus was as follows for the cured film: 25° C.:226.0 psi; 0° C.: 217.0 psi; −20° C.:777.4 psi; −40° C.:71,796.0 psi; and −60° C.:222, 675.0 psi.

An excellent value for water absorption of 1.40% was measured in the manner described in Example I, after a 24 hour soak, as an average of three samples.

Other samples of this coating were tested under the same accelerated aging conditions as in Example I. The following properties were observed for the cured coating described in this Example:

|  | 125° C. 7 days | 93.3° C. 10 days | 93.3° C. 10 days 95% RH | 93.3° C. 30 days | 93.3° C. 30 days 95% RH |
|---|---|---|---|---|---|
| weight change (%) | −6.89 | −6.42 | −0.89 | −6.50 | −0.23 |
| Tg (midpoint) (°C.) | −29.4 | −29.6 | −32.8 | −28.4 | −33.9 |
| 2.5% modulus at 25° C. (psi) | 229.5 | 229.3 | 220.0 | 236.1 | 173.0 |
| 2.5% modulus change, % at 25° C. | 6.8 | 6.7 | 2.4 | 9.9 | −19.5 |
| rupture strength (psi) | 126.1 | 137.6 | 93.4 | 117.2 | 90.7 |
| % elongation at break | 88.6 | 81.2 | 64.0 | 73.3 | 63.7 |

Glass adhesion, a measure of strippability, was measured at about 84 grams of force at 50% relative humidity and about 28 grams at 95% relative humidity, considerably higher than the comparable values in Example I.

However, a percent change of only 31.2% was measured in the gasoline swell test, slightly superior to Example I.

EXAMPLE III

A Primary Coating Having Organic Solvent and Water Resistance Which is Thermally, Hydrolytically and Oxidatively Stable The following composition was made up:

| Ingredient | Parts by Weight |
|---|---|
| ALU-351 polyether-based aliphatic urethane acrylate oligomer based on polytetra- methylene polyol (from Echo Resins and Laboratory) (A) | 56.00 |
| Aronix M-117 polypropylene glycol nonylphenylether acrylate monomer (from Toagasei) (B) | about 32.50 |
| A-172 vinyl-tris-(2-methoxyethoxy silane) adhesion promoter (from Union Carbide) (C) | 1.00 |
| Irgacure 184 hydroxycyclohexyl phenyl ketone photoinitiator (from Ciba-Geigy) (D) | 4.00 |
| Isooctyl-3-mercaptopropionate chain transfer agent (E)* | 5.50 |
| Irganox 1035 thiodiethylene bis-(3,5-di-tert-butyl-4-hydroxy) hydrocinnamate antioxidant and thermal stabilizer (from Ciba-Geigy) (F)* | 1.00 |
| A-1110 3-aminopropyl trimethoxysilane shelf stabilizer (from Union Carbide) (F)* | 0.00375 |

Before cure, the coating composition of this Example had the following temperature/viscosity profile, measured by Brookfield viscometer, model LVT, 6 rpm, #34 spindle: 25° C.:5440 cps; 28° C.:4280 cps; 30° C.:3490 cps; 35° C.:2370 cps; and 40° C.:1085 cps. The uncured composition had a refractive index of 1.4852 at 26.0° C. and a density of 8.69 lb/gal (1.04 g/cc).

A 6 mil coating was cast and cured as in previous Examples.

The cured film of this Example had a rupture strength of 99.4 psi; elongation at break of 60.4%; TGA volatiles content of 4.86%; oxidative induction temperature of 193° C.; and a cured film refractive index of 1.4949 at 25.7° C. Its glass transition temperature was −38.6° C. (midpoint) (−48.7° C. onset) and its cure ratio was 85.4%.

The effect of temperature on 2.5% modulus was as follows for the cured film: 25° C.:244.0 psi; 0° C.:223.8 psi; −20° C.:618 3 psi, −40° C.:49,187 psi; and −60° C.:202,582 psi.

A water absorption value, measured as in Example I, after a 24 hour soak, of 1.58% was measured, as an average of three samples.

Other samples were subjected to the accelerated aging tests described in Example I, and the following properties observed:

|  | 125° C. 7 days | 93.3° C. 10 days | 93.3° C. 10 days 95% RH | 93.3° C. 30 days | 93.3° C. 30 days 95% RH |
|---|---|---|---|---|---|
| weight change (%) | −6.07 | −4.81 | 0.51 | −5.26 | −0.46 |
| 2.5% modulus at 25° C. (psi) | 238.5 | 253.9 | 234.0 | 259.4 | 199.3 |
| 2.5% modulus change (%) at 25° C. | −2.3% | 4.1% | −4.1% | 6.3% | −18.3% |
| rupture strength (psi) | 92.5 | 100.9 | 94.1 | 95.2 | 84.2 |
| % elongation at break | 56.5 | 57.2 | 58.1 | 51.7 | 62.6 |

The samples had excellent long term stability as well as organic solvent and moisture resistance.

Glass adhesion was measured at about 31 grams of force at 50% relative humidity and about 13 grams of force at 95% relative humidity, for an average of four samples. A percent change (length) of 34.7 was measured after a four hour soak in gasoline at room temperature.

EXAMPLE IV

Another Primary Coating Having Acceptable Viscosity, Refractive Index and Strippability The following coating composition was made up:

| Ingredient | Parts by Weight |
|---|---|
| ALU-352 polyether-based aliphatic urethane acrylate oligomer analogous to the oligomer of Example I except having a molecular weight about 1.5 times as high, a higher viscosity and a lower modulus (from Echo Resins) (A) | 55.0 |
| Photomer 4003 polyethylene glycol nonylphenylether acrylate monomer (higher ethoxylation than M-111 monomer used in Example I) (from Henkel Corporation, Ambler, PA) (B) | 22.0 |
| lauryl acrylate monomer (B) | 12.00 |
| A-172 vinyl-tris-(2-methoxy-ethoxy silane) adhesion promoter (from Union Carbide) (C) | 1.00 |
| Irgacure 184 hydroxycyclohexyl phenyl ketone photoinitiator (D) | 6.00 |
| Octadectyl-3-mercaptopropionate chain transfer agent (E)* | 2.50 |
| Irganox 1035 thiodiethylene bis-(3,5-di-tert-butyl-4-hydroxy) hydrocinnamate antioxidant and | 1.5 |

-continued

| Ingredient | Parts by Weight |
|---|---|
| stabilizer (F)* | |

This coating composition had a viscosity, at 25° C., of 4900 cps and a refractive index of 1.4795. A six mil film of this coating had desirably low adhesion to a glass sheet. No accelerated aging tests were performed, but it is expected that the coating will perform well under such conditions.

EXAMPLE V

A Composition Having Good Aging Characteristics But Less Than Optimal Swelling

The following composition, similar to that of Example II, was made up:

| Ingredient | Parts by Weight |
|---|---|
| ALU-353 polyether-based aliphatic urethane acrylate oligomer analogous to the oligomer of Example II except having a molecular weight about 2.0 times that of ALU-351, a higher viscosity and a lower modulus (from Echo Resins) (A) | 36.75 |
| Aronix M-111 polyethylene glycol nonylphenylether acrylate monomer (from Toagasei) (B) | 55.00 |
| A-172 vinyl-tris-(2-methoxyethoxy silane) (from Union Carbide) (C) | 1.00 |
| Irgacure 184 hydroxycyclohexyl phenyl ketone photoinitiator (from Ciba Geigy) (D) | 6.00 |
| Isooctyl-3-mercaptopropionate chain transfer agent (E)* | 0.25 |
| Irganox 1035 thiodiethylene bis-(3,5-di-tert-butyl-4-hydroxy) hydrocinnamate stabilizer (from Ciba Geigy) (F)* | 1.00 |

The uncured coating had a viscosity of 5050 cps at 25° C. and a cure ratio of 82.4%. The composition, when cast, cured and subjected to the accelerated aging conditions of Example 1, performed well, but had a swelling value of 46.0%. This is believed to be a somewhat deleterious result of using a higher molecular weight oligomer.

EXAMPLE VI

A Composition Exhibiting Low Swelling Prepared from A Mixture of Oligomers and Absent A Chain Transfer Agent The following composition was made:

| Ingredient | Parts by Weight |
|---|---|
| ALU-354 polyether-based aliphatic urethane acrylate oligomer analogous to that of Example I, but having a molecular weight about 2.6 times as high (from Echo Resins) (A) | 20.00 |
| Uvithane ZL-1178 polyether-based aliphatic urethane acrylate oligomer (from Morton Thiokol Inc., Princeton, NJ) (A) | 20.00 |
| Aronix M-111 polyethylene | 52.00 |

| Ingredient | Parts by Weight |
| --- | --- |
| glycol nonylphenylether acrylate (from Toagasei) (B) | |
| A172 vinyl-tris-(2-methoxyethoxy silane) (from Union Carbide) (C) | 1.00 |
| Irgacure 184 hydroxy cyclohexyl-phenyl ketone photoinitiator from (Ciba Geigy) (D) | 6.00 |
| Irganox 1035 thiodiethylene bis-(3,5-di-tert-butyl-4-hydroxy) hydrocinnamate stabilizer (from Ciba Geigy) (F)* | 1.00 |

The composition had a viscosity of 6420 cps at 25° C. and a modulus of 264.3 psi. When cast, cured and tested as in previous Examples, a gasoline swelling measurement of 36.7% was recorded.

EXAMPLE VII

A Composition Made From A Mixture of Oligomers

The following formulation was made up:

| Ingredient | Parts by Weight |
| --- | --- |
| ALU-350 polyether-based aliphatic urethane acrylate based on polytetramethylene polyol (from Echo Resins) (A) | 36.00 |
| ALU-353 polyether acrylate analogous to ALU-350, but having 2.7 times the molecular weight (Echo Resins) (A) | 10.00 |
| Aronix M-111 polyethylene glycol nonylphenylether acrylate (from Toagasei) (B) | 35.00 |
| A-172 vinyl-tris-(2-methoxy-ethoxy silane) adhesion promoter (from Union Carbide) (C) | 2.00 |
| Irgacure 184 hydroxycyclohexyl-phenyl ketone photoinitiator (from Ciba-Geigy) (D) | 6.00 |
| Octadecyl-3-mercaptopropionate chain transfer agent (E)* | 10.00 |
| Irganox 1035 thiodiethylene bis-(3,5-di-tert-butyl-4-hydroxy) hydrocinnamate stabilizer (from Ciba Geigy) (F)* | 1.00 |
| A-1110 aminopropyl-3-methoxy-ethoxy silane (from Union Carbide) (F)* | 0.01 |

This composition had a viscosity of 2620 cps at 25° C. When drawn down and cured as in earlier Examples, a cure ratio of 68.2%, a gasoline swelling value of 35.4%, and peel test values at 50% relative humidity of 105.0 grams and at 95% relative humidity of 45.4 grams were measured.

EXAMPLE VIII

A Composition Having Good Solvent Resistance and Good Thermal Aging Properties The following composition was made up:

| Ingredient | Parts by Weight |
| --- | --- |
| Purelast ® 569 polyether-based aliphatic urethane acrylate (from Polymer Systems Corp., Orlando, Florida) (A) | 8.0 |
| ALU-350 polyether-based aliphatic urethane acrylate oligomer based on polytetra-methylene polyol (from Echo) (A) | about 44.00 |
| Aronix M-111 polyethylene glycol nonylphenylether acrylate monomer (from Toagasei) (B) | 34.00 |
| A-172 vinyl-tris-(2-methoxy-ethoxy silane) adhesion promoter (from Union Carbide) (C) | 2.00 |
| Irgacure 184 hydroxycyclohexyl-phenyl ketone photoinitiator (from Ciba Geigy) (D) | 6.00 |
| Isooctyl-3-mercaptopropionate chain transfer agent (E)* | 5.00 |
| Irganox 1035 thiodiethylene bis(3,5-di-tert-butyl-4-hydroxy) hydrocinnamate stabilizer (from Ciba Geigy) (F)* | 1.00 |
| A-1110 3-aminopropyl trimethoxysilane stabilizer (from Union Carbide) (F)* | 0.0025 |

The composition had a viscosity of 4100 cps at 25° C.

When cast and cured (at 0.7 J/cm$^2$ in air) as in preceding Examples, the composition performed well: it exhibited a 2.5% modulus at 25° C. of 228.1 psi; swelled 28.4% in length after soaking in gasoline at room temperature for 4 hours; required 110 grams of force to peel at 50% relative humidity and 46 grams at 95% relative humidity; and performed well after seven days' aging at 125° C.

EXAMPLE IX

Another Composition Which Performed Well On Long Term Thermal Aging

The following composition was made up:

| Ingredient | Parts by Weight |
| --- | --- |
| Purelast ® 566 polyether-based aliphatic urethane acrylate oligomer (from Polymer Systems Corp.) (A) | 64.00 |
| Aronix M-117 polypropylene glycol nonylphenylether acrylate (from Toagasei) (B) | 20.00 |
| lauryl acrylate (B) | 10.00 |
| A-172 vinyl-tris (2-methoxy-ethoxy silane) adhesion promoter (from Union Carbide) (C) | 1.00 |
| Darocur 1173 hydroxymethyl-phenyl propanone photoinitiator (from Ciba Geigy) (D) | 4.00 |
| Irganox 1010 tetrakis [methylene (3,5-di-tert-butyl-4-hydroxy-hydrocinnamase)]methane | 1.00 |

This composition had a viscosity of 4920 cps at 25° C. It was cast and cured as in previous Examples, and, after cure, had a cure ratio of 55.3%. It performed well after dry aging at 125° C. for 7 days.

EXAMPLE X

A Composition Having Good Solvent Resistance and Higher Adhesion

The following composition was made up:

| Ingredient | Parts by Weight |
| --- | --- |
| Purelast ® 590 polyether-based aliphatic urethane acrylate oligomer (from Polymer Systems Corp.) (A) | 46.00 |
| Aronix M-111 polyethylene glycol nonylphenylether acrylate monomer (from Toagasei) (B) | 39.95 |
| Lauryl acrylate (B) | 5.00 |
| A-172 vinyl-tris-(2-methoxy-ethoxy silane) adhesion promoter (from Union Carbide) (C) | 1.00 |
| Irgacure 184 hydroxycyclohexyl-phenyl ketone photoinitiator (from Ciba Geigy) (D) | 4.00 |
| Isooctyl-3-mercaptopropionate chain transfer agent (E)* | 3.00 |
| Irganox 1035 thiodiethylene bis (3,5-di-tert-butyl-4-hydroxy) hydrocinnamate stabilizer (from Ciba Geigy) (F)* | 1.00 |
| A-1110 3-aminopropyl trimethoxysilane stabilizer (F) | 0.05 |

The uncured composition had a viscosity of 4900 cps at 25° C.

When cast and cured as in previous Examples, the composition exhibited a 2.5% modulus at 25° C. of 149.2 psi; swelled only 26.5% in length after soaking in gasoline at room temperature for 4 hours; and required 198.9 grams of force to peel at 50% relative humidity. It is expected to perform well on long term aging.

EXAMPLE XI

A Secondary Coating Formulation Suitable For Use With The Primary Coatings of this Invention The following coating composition was prepared:

| Ingredient | Parts by Weight |
| --- | --- |
| Photomer 6008 aliphatic urethane acrylate oligomer with polyether backbone, having an acrylate functionality of 2.6 (from Henkel Corporation, Ambler, PA) | 34.00 |
| AB2010A aliphatic urethane acrylate oligomer with polyether backbone, having an acrylate functionality of 2.4 (from American Biltrite Inc., Lawrenceville, NJ) | 34.00 |
| Hexanediol diacrylate | 13.98 |
| Isobornyl acrylate | 13.00 |
| Irgacure 184 hydroxycyclohexylphenyl ketone photoinitiator (from Ciba Geigy) | 4.00 |
| Irganox 1035 thiodiethylene bis (3,5-di-tert-butyl-4-hydroxy) hydrocinnamate stabilizer (from Ciba Geigy) | 1.00 |
| DC 57 surface tension adjustment additive (from Dow Corning, Midland MI) | 0.02 |

This coating composition, before cure, had the following temperature/viscosity profile, measured using a Brookfield viscometer, model LVT, 6 rpm, #34 spindle: 5430 cps at 25° C.; 4310 cps at 28° C.; 3440 cps at 30° C.; 2310 cps at 35° C.; and 1520 cps at 40° C. The liquid composition had a refractive index of 1.4856 at 24.6° C. and a density of 8.89 lb/gal (1.07 g/cc).

A 6 mil coating of the composition was cast and cured as in previous Examples. The cured film of this Example had a rupture strength of 3812 psi; elongation at break of 26.7%; TGA volatiles content of 4.78%; oxidative induction temperature of 210° C.; and cured film refractive index of 1.5060 at 24.6° C. Its cure speed was determined to be 0.4 J/cm². The 2.5% tensile modulus of the coating was 90,528 psi at 25° C. and 4070 psi at 85° C. A water absorption value of 1.59% was measured in the manner described in Example I, after a 24 hour soak.

Other samples of this coating were tested under the following accelerated aging conditions:

(1) 125° C. for 7 days;
(2) 93.3° C. for 10 days;
(3) 93.3° C. for 10 days at 95% RH;
(4) 93.3° C. for 30 days; and
(5) 93.3° C. for 30 days at 95% RH.

The following properties were observed for the cured coating described in this Example:

|  | 125° C. 7 days | 93.3° C. 10 days | 93.3° C. 10 days 95% RH | 93.3° C. 30 days | 93.3° C. 30 days 95% RH |
| --- | --- | --- | --- | --- | --- |
| weight change (%) | −4.42 | −4.22 | −0.88 | −4.26 | −2.42 |
| 2.5% mod. at 25° C. (psi) | 124,633 | 122,136 | 88,281 | 122,522 | 97,850 |
| 2.5% modulus change (%) at 25° C. | 36.1 | 33.4 | −3.6 | 33.8 | 6.9 |
| 2.5% mod. at 85° C. (psi) | 4208 | 4343 | 3705 | 4408 | 3466 |
| 2.5% modulus change (%) at 85° C. | 3.0 | 6.3 | −9.3 | 7.9 | −15.2 |
| rupture strength (psi) | 4868 | 4362 | 3981 | 4535 | 3823 |
| % elongation at break | 30.7 | 25.8 | 30.0 | 30.3 | 21.8 |

EXAMPLE XII

Another Secondary Coating Formulation

The following coating composition was prepared:

| Ingredient | Parts by Weight |
| --- | --- |
| Photomer 6008 aliphatic urethane acrylate oligomer with polyether backbone, having an acrylate functionality of 2.6 (from Henkel Corporation) | 34.00 |
| AB2010A aliphatic urethane acrylate oligomer with polyether backbone, having an acrylate functionality of 2.4 (from American Biltrite Inc.) | 34.00 |
| Hexanediol diacrylate | 13.99 |
| Isobornyl acrylate | 13.00 |
| Irgacure 184 hydroxycyclohexylphenyl ketone photoinitiator (from Ciba | 4.00 |

| Ingredient | Parts by Weight |
| --- | --- |
| Geigy) | |
| Irganox 1035 thiodiethylene bis (3,5-di-tert-butyl-4-hydroxy) hydrocinnamate stabilizer (from Ciba Geigy) | 1.00 |
| DC57 surface tension adjustment additive (from Dow Corning) | 0.01 |

The uncured coating of this Example had a refractive index of 1.4856 at 24.2° C. and a viscosity of 5320 cps at 25° C.

A 6 mil coating was cast and cured as in previous Examples to produce a cured film having an oxidative induction temperature of 194° C. and a cure ratio (ratio of 2.5% moduli at 25° C. when cured in air at 0.2 J/cm$^2$ and at 0.7 J/cm$^2$, respectively) of 100.9%.

The coating, which is very similar to that of the previous Example, is expected to perform equally well on long term aging, and is similarly well suited for use as a secondary coating atop the primary coatings of the invention.

Comparative Example I

A Primary Coating Composition Which Aged Poorly

The following composition was formulated:

| Ingredient | Parts by Weight |
| --- | --- |
| CN-966 polyester-based aliphatic urethane acrylate oligomer (from Sartomer Company) (A) | 45.00 |
| Aronix M-111 polyethylene glycol nonylphenylether acrylate (from Toagasei Chemical Industry Company, Ltd.) (B) | 34.50 |
| lauryl acrylate (B) | 11.00 |
| Chemlink-2000 50-50 mixture of linear C14 and C15 diol diacrylates (from Sartomer Company, Exton, PA) (B) | 1.50 |
| A-172 vinyl-tris(2-methoxyethoxy silane) (from Union Carbide) (C) | 1.00 |
| Irgacure 184 hydroxycyclohexyl-phenyl ketone photoinitiator (D) | 6.00 |
| Irganox 1076 octadecyl-3,5-(di-tert-butyl-4-hydroxy)hydrocinnamate stabilizer (from Ciba Geigy) (F)* | 1.00 |

The liquid coating had an acceptable viscosity of 4630 cps at 25° C., and a good cure ratio of 62.4%, but, when cast on a glass sheet as a 6 mil coating, cured, and subjected to the accelerated aging tests described in Example I, performed very poorly under high humidity and/or high temperature conditions.

Comparative Example II

A Composition Having Good Solvent Resistance But Poor Thermal Aging Stability

A composition was made up which was identical to that of Example VIII above, but containing, in lieu of the Purelast® 569 oligomer, Purelast® 169V oligomer, an analogous oligomer to 569 but based on an aromatic polyether rather than on an aliphatic polyether and of higher molecular weight.

This composition had a viscosity of 4230 cps at 25° C., and performed well, before thermal aging, as well: it had a 2.5% modulus of 214.1 psi (when cured in air at 0.7 J/cm$^2$); swelled 28.2% when soaked in gasoline; and required 85.0 grams and 39.6 grams of force at 50% and 95% relative humidity, respectively, to peel. However, upon thermal aging at 125° C. for only 3 days, an exudate was noted, indicating thermal instability.

CONCLUSION

The primary coatings of the present invention, then, have several important qualities which make optical fibers coated with them useful for many applications and particularly suitable in local area networks for fiber-to-the-home uses.

These coatings, when cured, possess excellent thermal, hydrolytic and oxidative stability over the long term, as predicted by accelerated aging tests at increased temperature and humidity, and are resistant to penetration of both water and organic solvents in order to protect the integrity of the underlying fibers.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A radiation-curable primary coating composition for an optical fiber comprising
   (A) from about 10 percent to about 90 percent by weight of an acrylate or methacrylate terminated urethane oligomer said oligomer having a number average molecular weight of not more than about 4,430 daltons which consists essentially of only carbon, hydrogen, nitrogen and oxygen atoms and which is the reaction product of (i) a polyether polyol; (ii) a non-aromatic polyisocyanate; and (iii) an endcapping monomer capable of providing an acrylate or methacrylate terminus;
   (B) from about 5 percent to about 80 percent by weight of one or more monomer diluents which do not adversely affect the composition when cured and which are selected from the group consisting of
      (i) alkyl acrylate and methacrylate monomers having 6 to 18 carbon atoms in the alkyl moiety;
      (ii) monomers having (1) an aromatic moiety, (2) a moiety containing acrylic or methacrylic unsaturation, and (3) a hydrocarbon moiety, which monomer (ii) is capable of increasing the refractive index of the composition relative to that of a composition containing only (A), (C) and (D), and
      (iii) mixtures thereof;
   (C) from about 0.1 percent to about 3.0 percent by weight of an organofunctional silane adhesion promoter which binds in with the coating composition during cure; and
   (D) optionally, from about 1.0 percent to about 10.0 percent by weight of a photoinitiator,
   wherein all of the stated percentages are percentages by weight based on total weight of (A), (B), (C) and (D),
   wherein the composition, after radiation cure, remains adherent and exhibits thermal, hydrolytic and oxidative stability at temperatures in excess of 90° C. and at 95% relative humidity and an increase in length from swelling of no more than about 40 percent when soaked in gasoline for four hours at room temperature and a water absorption value of no more than about 5% by weight;

wherein the composition is devoid of acid-functional materials; and wherein said primary coating composition, after radiation cure, has a tensile modulus of less than 500 psi.

2. A radiation-curable coating composition according to claim 1 wherein said polyether polyol (i) is based on a straight chained or branched alkylene oxide of from one to about twelve carbon atoms.

3. A radiation-curable primary coating composition for an optical fiber according to claim 1 wherein said non-aromatic polyisocyanate (ii) is selected from the group consisting of isophorone diisocyanate; dicyclohexylmethane-4,4'-diisocyanate; 1,6-hexamethylene diisocyanate; trimethylhexamethylene diisocyanate; and mixture thereof.

4. A radiation-curable coating composition according to claim 1 wherein said monomer (B) is selected from the group consisting of hexyl acrylate; hexyl methacrylate; 2-ethylhexyl acrylate; 2-ethylhexyl methacrylate; isooctyl acrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; $C_{14}$–$C_{15}$ hydrocarbon diol diacrylates; $C_{14}$–$C_{15}$ hydrocarbon diol diacrylates; polyalkylene glycol nonylphenylether acrylates; polyalkylene glycol nonylphenylether methacrylates; and mixtures thereof.

5. A radiation-curable coating composition according to claim 1 wherein said monomer component (B) comprises a mixture of (i) a monomer selected from the group consisting of lauryl acrylate; stearyl acrylate; isodecyl acrylate; and mixtures thereof, and (ii) a monomer selected from the group consisting of polyethylene glycol nonylphenylether acrylate; polypropylene glycol nonylphenylether acrylate; and mixtures thereof.

6. A radiation-curable coating composition according to claim 1 wherein said silane adhesion promoter (C) is selected from the group consisting of amino-functional silanes; mercapto-functional silanes; methacrylate-functional silanes; acrylamido-functional silanes; allyl-functional silanes; vinyl-functional silanes; acrylate-functional silanes; and mixtures thereof.

7. A radiation-curable coating composition according to claim 1 wherein said silane adhesion promoter (C) is selected from the group consisting of mercaptoalkyl trialkoxy silane; vinyl alkoxy silane; methacryloxyalkyltrialkoxy silane; aminoalkyl trialkoxy silane; and mixtures thereof.

8. A radiation-curable coating composition according to claim wherein said silane adhesion promoter (C) is vinyltris- (2-methoxyethoxy silane).

9. A radiation-curable coating composition according to claim 1 wherein said photoinitiator (D) is selected from the group consisting of hydroxycyclohexylphenyl ketone; hydroxymethylphenyl propanone; dimethoxyphenyl acetophenone; 2-methyl-1-[4-(methyl thio)phenyl]-2-morpholino-propanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-2-(2-hydroxy-2-propyl)ketone; diethoxyacetophenone; 2,2-di-sec-butoxyacetophenone; diethoxyphenyl acetophenone; and mixtures thereof.

10. A radiation-curable coating composition according to claim 1 wherein said photoinitiator (D) is hydroxycyclohexylphenyl ketone.

11. A radiation-curable coating composition according to claim 1 additionally comprising from about 0.1 percent to about 10 percent by weight, based on total weight of (A), (B), (C) and (D), of a mercapto functional chain transfer agent (E).

12. A radiation-curable coating composition according to claim 11 wherein said chain transfer agent (E) is selected from the group consisting of methyl thioglycolate; methyl-3-mercaptopropionate; ethyl thioglycolate; butyl thioglycolate; butyl-3-mercaptopropionate; isooctyl thioglycolate; isooctyl-3-mercaptopropionate; isodecyl thioglycolate; isodecyl-3-mercaptopropionate; dodecyl thioglycolate; dodecyl-3-mercaptopropionate; octadecyl thioglycolate; octadecyl-3-mercaptopropionate; and mixtures thereof.

13. A radiation-curable coating composition according to claim 11 wherein said chain transfer agent is isooctyl-3-mercaptopropionate.

14. A radiation-curable coating composition to claim 1 additionally comprising from about 0.0001 percent to about 3.0 percent by weight, based on total weight of (A), (B), (C) and (D), of a stabilizer (F) selected from the group consisting of organic phosphites; silanes; hindered phenols; amines; and mixtures thereof.

15. A radiation-curable coating composition according to claim 14 wherein said stabilizer (F) is 3-aminopropyl trimethoxysilane.

16. A radiation-curable coating composition according to claim 14 wherein said stabilizer (F) is thiodiethylene bis-(3,5-di-tert-butyl-4-hydroxy) hydrocinnamate.

17. A radiation-curable primary coating composition for an optical fiber comprising (A) from about 10 percent to about 90 percent by weight of an acrylate- or methacrylate-terminated urethane oligomer said oligomer having a number average molecular weight of not more than about 2,300 daltons which consists essentially of only carbon, hydrogen, nitrogen and oxygen atoms and which is the reaction product of (i) a polyether polyol; (ii) a non-aromatic polyisocyanate; and (iii) an endcapping monomer selected from the group consisting of hydroxyalkylacrylate and hydroxyalkylmethacrylate;

(B) from about 5 percent to about 80 percent by weight of one or more acrylate or methacrylate monomer diluents and which do not adversely affect the composition when cured and which are selected from the group consisting of (i) alkyl acrylate and methacrylate monomers having 6 to 18 carbon atoms in the alkyl moiety;

(ii) monomers having (1) an aromatic moiety, (2) a moiety containing acrylic or methacrylic unsaturation, and (3) a hydrocarbon moiety, which monomer (ii) is capable of increasing the refractive index of the composition relative to that of a composition containing only (A), (C) and (D), and (iii) and mixtures thereof;

(C) from about 0.1 percent to about 3.0 percent by weight of an organofunctional silane adhesion promoter which binds in with the coating composition during cure; and (D) optionally, from about 1.0 percent to about 10 percent by weight of a photoinitiator, wherein all of the stated percentages are percentages by weight based on total weight of (A), (B), (C) and (D)

wherein the composition, after radiation cure, remains adherent and exhibits thermal, hydrolytic and oxidative stability at temperatures in excess of 90° C. and at 95% relative humidity and an increase in length from swelling of no more than about 30 percent when soaked in gasoline for four hours at room temperature and a water absorption value of no more than about 5% by weight;

wherein the composition is devoid of acid-functional materials; and wherein said primary coating composition, after radiation cure, has a tensile modulus of less than 500 psi.

18. A radiation-curable coating composition according to claim 17 wherein said polyether polyol (i) is based on a straight chained or branched alkylene oxide of from one to about twelve carbon atoms.

19. A radiation-curable primary coating composition according to claim 17 wherein said aliphatic polyisocyanate (ii) is selected from the group consisting of isophorone diisocyanate; dicyclohexylmethane-4,4'-diisocyanate; 1,6-hexamethylene diisocyanate; trimethylhexamethylene diisocyanate; and mixture thereof.

20. A radiation-curable coating composition according to claim 17 wherein said monomer (B) is selected from the group consisting of hexyl acrylate; hexyl methacrylate; 2-ethylhexyl acrylate; 2-ethylhexyl methacrylate; isooctyl acrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; stearyl acrylate; stearyl methacrylate; $C_{14}$–$C_{15}$ hydrocarbon diol diacrylates; $C_{14}$–$C_{15}$ hydrocarbon diol dimethacrylates; polyalkylene glycol nonylphenylether acrylates; polyalkylene glycol nonylphenylether methacrylates; and mixtures thereof.

21. A radiation-curable coating composition according to claim 17 wherein said monomer component (B) comprises a mixture of (i) a monomer selected from the group consisting of lauryl acrylate; stearyl acrylate; isodecyl acrylate; and mixtures thereof, and (ii) a monomer selected from the group consisting of polyethylene glycol nonylphenylether acrylate; polypropylene glycol nonylphenylether acrylate; and mixtures thereof.

22. A radiation-curable coating composition according to claim 17 wherein said silane adhesion promoter (C) is selected from the group consisting of amino-functional silanes; mercapto-functional silanes; methacrylate-functional silanes; acrylamido-functional silanes; allyl-functional silanes; vinyl-functional silanes; acrylate-functional silanes; and mixtures thereof.

23. A radiation-curable coating composition according to claim 17 wherein said silane adhesion promoter (C) is selected from the group consisting of mercaptoalkyl trialkoxy silane; vinyl alkoxy silane; methacryloxyalkyltrialkoxy silane; aminoalkyl trialkoxy silane; and mixtures thereof.

24. A radiation-curable coating composition according to claim 17 wherein said silane adhesion promoter (C) is vinyl-tris- (2-methoxyethoxy silane).

25. A radiation-curable coating composition according to claim 17 wherein said photoinitiator (D) is selected from the group consisting of hydroxycyclohexylphenyl ketone; hydroxymethylphenyl propanone; dimethoxyphenyl acetophenone; 2-methyl-1-[4-(methylthio)phenyl]-2-morpholino-propanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-2(2-hydroxy-2-propyl)ketone; diethoxyacetophenone; 2,2-di-sec-butoxyacetophenone; diethoxyphenyl acetophenone; and mixtures thereof.

26. A radiation-curable coating composition according to claim 17 wherein said photoinitiator (D) is hydroxycyclohexylphenyl ketone.

27. A radiation-curable coating composition according to claim 17 additionally comprising from about 0.1 percent to about 10 percent by weight, based on total weight of (A), (B), (C) and (D), of a mercapto functional chain transfer agent (E).

28. A radiation-curable coating composition according to claim 27 wherein said chain transfer agent (E) is selected from the group consisting of methyl thioglycolate; methyl-3-mercaptopropionate; ethyl thioglycolate; butyl thioglycolate; butyl-3-mercaptopropionate; isooctyl thioglycolate; isooctyl-3-mercaptopropionate; isodecyl thioglycolate; isodecyl-3-mercaptopropionate; dodecyl thioglycolate; dodecyl-3-mercaptopropionate; octadecyl thioglycolate; octadecyl-3-mercaptopropionate; and mixtures thereof.

29. A radiation-curable coating composition according to claim 27 wherein said chain transfer agent is isooctyl-3-mercaptopropionate.

30. A radiation-curable coating composition according to claim 17 additionally comprising from about 0.0001 percent to about 3.0 percent by weight, based on total weight of (A), (B), (C) and (D), of a stabilizer (F) selected from the group consisting of organic phosphites; silanes; hindered phenols; amines; and mixtures thereof.

31. A radiation-curable coating composition according to claim 30 wherein said stabilizer (F) is 3-aminopropyl trimethoxysilane.

32. A radiation-curable coating composition according to claim 30 wherein said stabilizer (F) is thiodiethylene bis-(3,5-di-tert-butyl-4-hydroxy) hydrocinnamate.

33. A radiation-curable primary coating composition for an optical fiber, comprising (A) from about 30 percent to about 70 percent by weight of a non-aromatic urethane acrylate oligomer said oligomer having a number average molecular weight of not more than about 4,430 daltons which consists essentially of only carbon, hydrogen, nitrogen and oxygen atoms and having as a backbone polytetramethylene polyol;

(B) from about 10 percent to about 60 percent by weight of a mixture of (i) polyethylene glycol nonylphenylether acrylate and (ii) lauryl acrylate;

(C) from about 0.3 percent to about 1.0 percent by weight of vinyl-tris-(2-methoxyethoxy silane) adhesion promoter which binds in with the coating composition during cure; and (D) from about 2.0 percent to about 7.0 percent by weight of hydroxycyclohexylphenyl ketone photoinitiator, wherein all of the stated percentages are percentages by weight, based on total weight of (A), (B), (C) and (D), wherein the composition, after radiation cure, remains adherent and exhibits thermal, hydrolytic and oxidative stability at temperatures in excess of 90° C. and at 95% relative humidity and an increase in length from swelling of no more than about 40 percent when soaked in gasoline for four hours at room temperature and a water absorption value of no more than about 5% by weight;

wherein the composition is devoid of acid-functional materials; and wherein said primary coating composition, after radiation cure, has a tensile modulus of less than 500 psi.

34. A radiation-curable coating composition according to claim 33 additionally comprising from about 0.5 percent to about 8.0 percent by weight, based on total weight of (A), (B), (C) and (D), of isooctyl-3-mercaptopropionate.

35. A radiation-curable coating composition according to claim 33 additionally comprising from about 0.5 percent to about 1.5 percent by weight, based on total weight of (A), (B), (C) and (D), of thiodiethylene bis-(3,5-di-tert-butyl-4-hydroxy) hydrocinnamate.

36. A radiation-curable coating composition according to claim 33 additionally comprising from about 0.0001 percent to about 0.01 percent by weight of 3-aminopropyl trimethoxysilane.

37. A radiation-curable primary coating composition for an optical fiber, comprising (A) from about 30 percent to about 70 percent by weight of a non-aromatic urethane acrylate oligomer said oligomer having a number average molecular weight of not more than about 4,430 daltons which consists essentially of only carbon, hydrogen, nitrogen and oxygen atoms and having as a backbone polytetramethylene polyol;

(B) from about 10 percent to about 60 percent by weight of polyethylene glycol nonylphenylether acrylate;

(C) from about 0.3 percent to about 1.0 percent by weight of vinyl-tris-(2-methoxyethoxy silane) adhesion promoter which binds in with the coating composition during cure; and (D) from about 2.0 percent to about 7.0 percent by weight of hydroxycyclohexylphenyl ketone photoinitiator, wherein all of the stated percentages are percentages by weight, based on total weight of (A), (B), (C) and (D), wherein the composition, after radiation cure, remains adhered and exhibits thermal, hydrolytic and oxidative stability at temperatures in excess of 90° C. and at 95% relative humidity and an increase in length from swelling of no more than about 40 percent when soaked in gasoline for four hours at room temperature and a water absorption value of no more than about 5% by weight;

wherein the composition is devoid of acid-functional materials; and wherein said primary coating composition, after radiation cure, has a tensile modulus of less than 500 psi.

38. A radiation-curable coating composition according to claim 37 additionally comprising from about 0.5 percent to about 8.0 percent by weight, based on total weight of (A), (B), (C) and (D), of isooctyl-3-mercaptopropionate.

39. A radiation-curable coating composition according to claim 37 additionally comprising from about 0.5 percent to about 1.5 percent by weight, based on total weight of (A), (B), (C) and (D), of thiodiethylene bis-(3,5-di-tert-butyl-4-hydroxy) hydrocinnamate.

40. A radiation-curable coating composition according to claim 37 additionally comprising from about 0.0001 percent to about 0.01 percent by weight of 3-aminopropyl trimethoxysilane.

41. A radiation-curable primary coating composition for an optical fiber consisting essentially of (A) from about 10 percent to about 90 percent by weight of a reactively terminated urethane oligomer said oligomer having a number average molecular weight of not more than about 4,430 daltons which consists essentially of only carbon, hydrogen, nitrogen and oxygen atoms and which is the reaction product of (i) a polyether polyol; (ii) non-aromatic polyisocyanate; and (iii) an endcapping monomer capable of providing an acrylate or methacrylate terminus;

(B) from about 5 percent to about 80 percent by weight of one or more monomers having (1) an aromatic moiety, (2) a moiety containing acrylic or methacrylic unsaturation, and (3) a hydrocarbon moiety, which monomer (B) is capable of increasing the refractive index of the composition relative to that of a composition containing only (A), (C) and (D);

(C) from about 0.1 percent to about 3.0 percent by weight of an organofunctional silane adhesion promoter which binds in with the coating composition during cure; and (D) optionally, from about 1.0 percent to about 10.0 percent by weight of a photoinitiator, wherein all of the stated percentages are percentages by weight based on total weight of (A), (B), (C) and (D), wherein the composition, after radiation cure, exhibits thermal, hydrolytic and oxidative stability including adequate adhesion at temperatures in excess of 90° C. and at 95% relative humidity and an increase in length from swelling of no more than about 40 percent when soaked in gasoline for four hours at room temperature and a water absorption value of no more than about 5% by weight;

wherein the composition is devoid of acid-functional materials; and wherein said coating composition, after radiation cure, has a tensile modulus of less than 500 psi.

42. A radiation-curable primary coating composition for optical fiber according to claim 41 additionally comprising from about 0.1 percent to about 10 percent by weight based on total weight of (A), (B), (C) and (D), of a mercapto functional chain transfer agent (E).

43. A radiation-curable primary coating composition for an optical fiber according to claim 41 additionally comprising from about 0.0001 percent to about 3.0 percent by weight, based on total weight of (A) (B), (C) and (D), of a stabilizer (F) selected from the group consisting of organic phosphites; silanes; hindered phenols; amines; and mixtures thereof.

* * * * *